Figure 1:
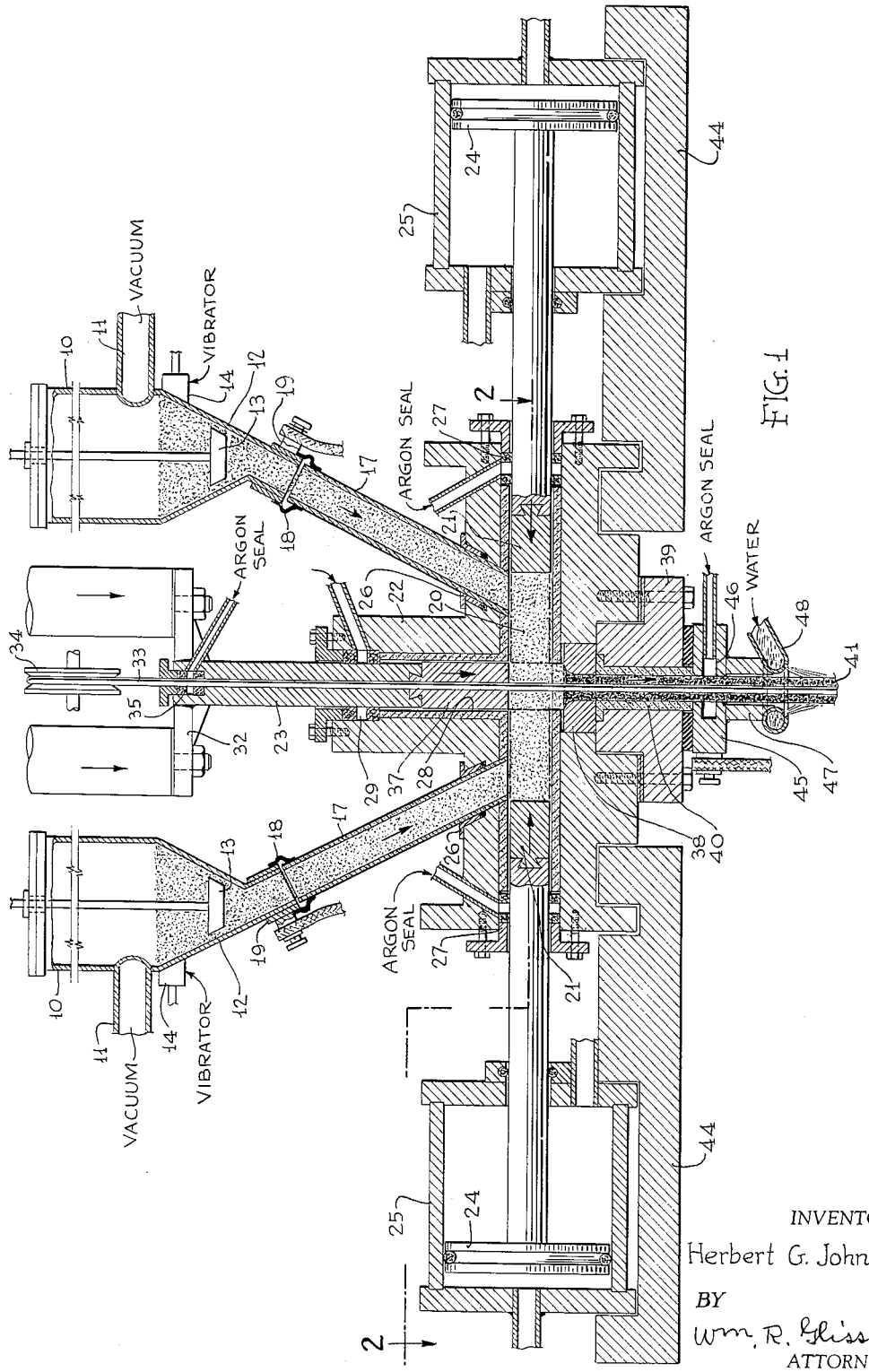

United States Patent Office 2,975,893
Patented Mar. 21, 1961

2,975,893

APPARATUS FOR CONSOLIDATING PARTICULATE MATERIALS CONTINUOUSLY WITHOUT MELTING

Herbert G. Johnson, 17 N. Drexel Ave., Havertown, Pa.

Filed Apr. 21, 1955, Ser. No. 502,997

5 Claims. (Cl. 207—2)

This invention relates to method and apparatus for consolidating electrically conductive particulate materials continuously without melting them and has for an object the provision of improvements in this art.

The invention is in certain respects an improvement upon the invention disclosed in my copending application Serial No. 474,576, filed December 10, 1954, now abandoned.

The present invention, like that of my copending application, is especially suited for the consolidation of refractory metals which are subject to rapid and extensive damage by air while hot. This group of metals includes titanium, uranium, zirconium and the like and their alloys. The invention can have uses for various thermoplastic electrically conductive materials which flow and knit or fuse together under heat and pressure. The term particulate is used herein to designate particles of material which can be flowed, compressed and fused and includes such forms as powder, sponge, chips, punchings, wire, bar-ends, scrap and the like.

An aim of the invention is to provide a continuous bar of refractory materials such as titanium and the like which can be used as a consumable electrode for an arc melting furnace to produce molten material. Heretofore such electrodes of this type of material have only been made in short lengths which had to be secured together to produce a long electrode. Besides being useful for electrodes, however, the continuous lengths of material made by the present process and apparatus may be used for casting, rolling, pressing or extruding or may be machined directly into shapes for some purposes.

A more particular object of the invention is to provide apparatus for heating and extruding material wherein the material is heated directly as it enters and passes through the extruding device. Heretofore the material has been heated by heat transferred through the container holding the metal but this heating weakens the container to the point where it is not strong enough to withstand the heavy working loads entailed in extruding the material. Sometimes, as a consequence, it has been the practice to protect the refractory material in a sealed envelope of a less refractory metal and later heat and compact the composite bar to consolidate the enclosed refractory material, and then later to strip off the envelope and use the consolidated refractory material.

Some attempts have been made to heat the material to be extruded by induction coils surrounding the container, but this initially softens the outer surface of the material and by the time the inner portion is properly heated the outer part may be overheated and has transferred so much heat to the container wall as to soften it. The outside-to-inside heat travel also existed where the containers were used to transfer heat, only in this case the container was more seriously heated. Induction heating also heats the container if it is of a material subject to being heated inductively as are steel and other strong materials needed for the containers.

By heating the material by passing an electric current directly through it so as to heat it by its own resistance, the heat is largely confined to the interior of the body of material and the container may receive but little heat. The container may, of course, be heated to some extent if desired but it may be left unheated or it may even be cooled so as to have maximum strength.

According to the present invention the heating current is passed through the column of material from the bar product and to the material feed inlet, the current passing through the compressing means, such as the electrically conductive active end of a compressing ram when present in the column of material, to heat the material along the entire column for softening it as it moves along. Since the body of the compressing means is so large it will pass the necessary current directly between portions of the column of material in contact with it without itself being appreciably heated—in contrast to the effect when the container is heated to heat the material.

Figure 2:
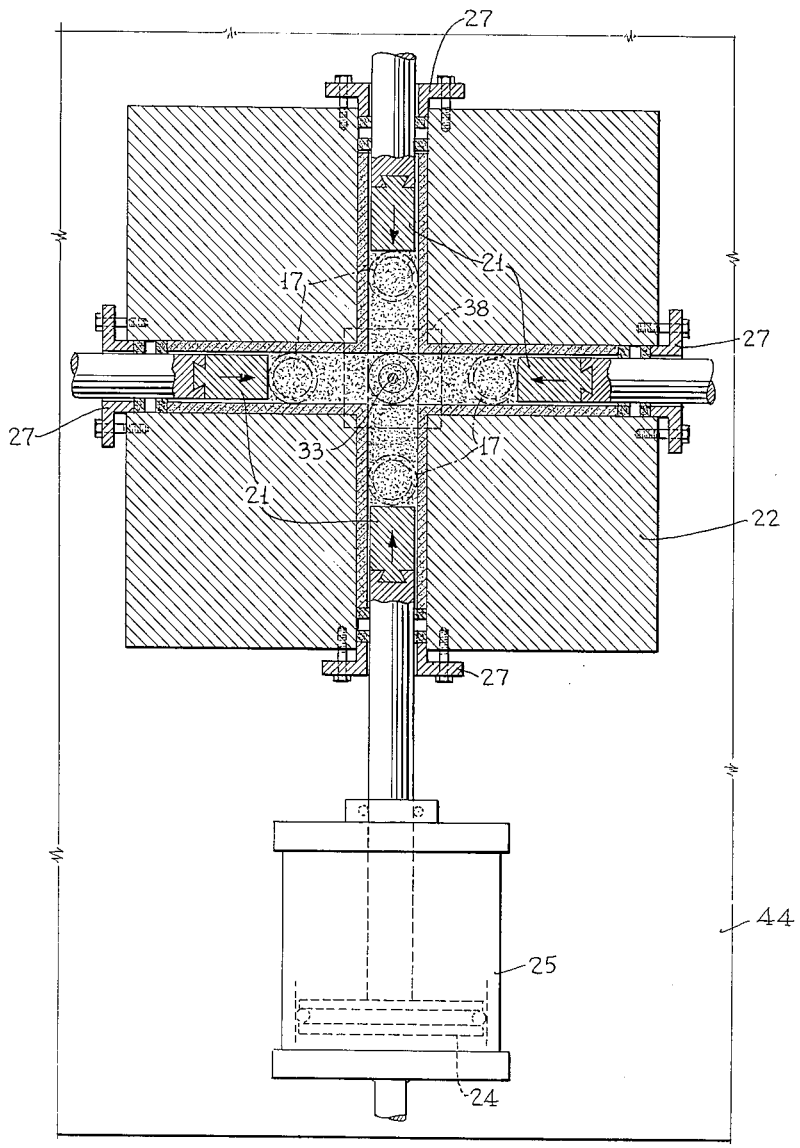

The above and other objects and advantages of the invention will be apparent from the following description of an exemplary embodiment, reference being made to the accompanying drawings of apparatus, wherein:

Fig. 1 is a vertical section through an extrusion press having both vertical and horizontal rams; and Fig. 2 is a horizontal section taken on the line 2—2 of Fig. 1.

As shown in the drawings, the particulate material, after full and adequate cleaning, is stored in sealed bins 10 which are maintained under vacuum, as by eduction pipes 11, to eliminate all air and gases. The material flows out a bottom tube or spout 12, the flow being regulated, as by a valve closure 13 which is adjustable without breaking the seal. Means may be provided for supplying material to the bins without breaking the vacuum seal and without stopping the apparatus. In order to assist the feed down of the material and to begin compacting it, the bin may be vibrated as by a vibrator 14.

A lead-off tube 17 is connected to the bin spout 12, as by a sealed flexible insulating connection 18. The tube 17 is formed or lined with electrically insulating material (here shown as formed of such material) so that only the particulate material within the tube can carry electric current, as from an electrode 19 connected to the bin spout 12 where the material has been compacted by vibration.

The tube 17 leads to a container having a chamber 20 of a lateral ram 21. In the present instance there are four lateral rams 21 and their horizontal compression chambers 20 are arranged in a common container block 22 of a main vertical extrusion ram 23. Each lateral ram is operated by a fluid actuated piston 24 of a cylinder 25.

The connections of the tubes 17 with the container block 22 are each sealed by a packed joint 26 and if the tubes should have metal jackets they are insulated from the containers. The piston rods or rams 21 are sealed with the container block 22, as by lantern joints 27 kept filled with an inert gas, such as argon, under pressure. The vertical ram 23 operates an extrusion chamber 28 of the container block 22 and the connection of the ram with the container is sealed by a lantern joint 29 carrying inert gas under pressure. The container chambers for all rams are lined with electrically non-conductive refractory material and are so shown.

The four lateral rams 21 when moved to the inner end of their stroke together form a space of approximately the size and shape of the vertical ram and define a close-fitting enclosure for the vertical ram on its downward extrusion stroke. This may be square or round or of any other desired sectional shape or may change from one shape to the other, as from square to round, or vice versa or from large to small, from top to bottom, in the latter cases the vertical ram fitting closely at the bottom end of the enclosure formed by the lateral rams.

The vertical ram 23 is operated by a piston or pistons through connections 32 and the ram may have a longitudinal channel to receive a core rod 33 which is unwound from a reel 34. A gas filled lantern seal 35 may be used around the core rod 33. The core rod may be composed of the same material as that from the bins or of a different material. Where the resultant extruded rod is used for an electrode, the composite materials may form an accurately proportioned alloy when melted. Or the resultant rod may provide interfusion of metals for bi-metal rods which otherwise would be very difficult to produce.

The vertical ram 23 is shown to be provided with an end piece 37 firmly secured thereto and composed of a hard heat-resistant electrically conductive material such as a hard metal carbide. The horizontal rams are shown to have similar hard heat-resistant electrically conductive end pieces.

A discharge extrusion die 38 having a bore with an orifice is secured in the lower end of the container chamber 28 of the vertical ram, being held therein by a retainer block 39 which is strongly secured to the container block 22. The retainer block 39 is provided with a tubular passage which is lined with an electrically insulating liner or tube 40, having a bore aligned with the bore of the die which causes electric current to be confined to the rod or bar 41 which is extruded through the die.

The container block 22 and the horizontal ram cylinders 25 are all supported and tied together by a strong base 44, this base and the cylinder of the vertical ram being mounted on the base and head of a large press or frame, not shown. The block 39 is also carried on the press or frame base.

A tubular gas seal electrode 45 is secured to and insulated from the block 39 and is in wiping contact with the bar or rod 41 as it issues from the extrusion press. The metal is protected from air contamination by an inert gas under pressure supplied to a surrounding channel 46 in the electrode, the gas flowing out through space provided in the lower part of the electrode and out through the space within a tubular extension 47 of any desired length. The issuing rod may be cooled by a water spray 48 at the end of the tube 47.

The insulating material of the tube 17, the ram container chamber liners, and the liner 40 may be of a type recently developed which has good electrical insulating properties and heat resistance and great mechanical strength, one such material being known as McDaniel Hi-temp combustion tube material.

In operation, current flows from the lower electrode 45 through the emerging rod and up through the compacted particulate material through the material in the containers, and through the conductive rams also when advanced, and through the material in the tube, to the upper electrodes 19. This heats the material directly to soften it for compacting and extrusion. The container is only secondarily heated and may be cooled if desired. In starting and before the issuing rod reaches the lower electrode, a conducting rod may be pushed up through the exit tube and die into the container to establish a connection between the lower electrode and the material in the container. This also seals the outlet against air entry.

The current between the electrodes 45 and 19 flows in series through the compacted rod 41, the material in the main container chamber 28, the material in the containers 20, and the material and the tubes 17. This current heats the material by resistive effects in the material itself and softens it. The heating effects are greater where the material is less compact, unless it is too loose to carry a good current, hence the material between the bins and main container is heated and softened to make it easier to press together and coalesce and extrude.

The rams 21 are first operated to compress material into the main container chamber 28, after which the main ram 23 is operated to force the material out through the die 38. Then the rams are retracted. The heating of material continues at all times, the current passing through the metallic rams when they separate the column of material which normally extends between the feed tubes and the outlet opening.

The valves 13 serve to control the flow of material into the tubes and also to close off the tubes when the bins are being refilled and the air evacuated. If sealed means are provided for refilling, of course, the latter function of the valves to completely close off the tubes will not be necessary.

The gas in the space 46 for the emerging rod will flow outward around the rod and protect it until it is cooled by the water spray at 48.

Another method of starting is to plug the outlet with a non-conducting material and to change the connections to the upper electrodes so that current flows down one, through the material in the container, and up to another upper electrode. As soon as the extruded rod begins to issue, the connections are changed back. At the end of a run the material may be left in the apparatus and when operations are restarted the current is turned on before the rams are operated for a sufficient length of time to soften the material.

The use of rams operating in different directions has special advantage in consolidating the particulate heated material. Four horizontal rams are shown but in some cases a single horizontal ram may be used. The multidirectional compressing effect on the particulate material would still be obtained. As is usual when one or more precompressing rams force material to the container of an extrusion ram operated at right angles to the compressing rams, the compressing ram or rams will be at the forward end of their stroke to form part of the extrusion chamber at the time when the extrusion ram forces the precompressed material down through the die.

It is thus seen that the invention provides an improved apparatus for heating, compressing and consolidating particulate material to form it directly into usable continuous bar which can be used for electrodes to produce molten metal, along with sponge or the like, without electrode contamination. The apparatus is relatively simple and inexpensive and the process is direct and economical.

While one embodiment has been particularly described by way of illustration, it is to be understood that there may be various embodiments within the general scope of the invention.

What is claimed is:

1. Apparatus for forming a continuous rod or bar from particulate electrically conductive material which is subject to rapid contamination when heated in air, comprising in combination, an extrusion container lined with electrically insulating material, a discharge extrusion die for said extrusion container, a reciprocatory ram of electrically conductive material movable in said container for extruding material through said die, an electrically insulating exit tube extending from said die for a distance to protect the issuing rod, an enclosed protected supply bin for particulate material, a supply tube connected between said container and bin for bringing particulate material from said bin to the container, said supply tube including electrical insulation for material within it, and electrodes providing contact with material entering said supply tube and emerging from said exit tube for passing an electric current in series through the emerging rod, through the material in the container when present to form a continuous column and the ram when present in the column of material, and thence through the material in said supply tube, without passing current through the walls of the container and tubes, the heat supplied to the material in the supply tube and container serving to heat and soften it by resistance heating effects for extrusion.

2. Apparatus for forming a continuous rod or bar from particulate electrically conductive material which is subject to rapid contamination when heated in air, comprising in combination, an extrusion container lined with electrically insulating material, a discharge extrusion die for said extrusion container, a reciprocatory ram of electrically conductive material movable in said container for extruding material through said die, an electrically insulating exit tube extending from said die for a distance to protect the issuing rod, an enclosed protected supply bin for particulate material, a supply tube connected between said container and bin for bringing particulate material from said bin to the container, said supply tube including electrical insulation for material within it, and electrodes providing contact with material entering said supply tube and emerging from said exit tube for passing an electric current in series through the emerging rod, through the material in the container when present to form a continuous column and the ram when present in the column of material, and thence through the material in said supply tube, without passing current through the walls of the container and tubes, the heat supplied to the material in the supply tube and container serving to heat and soften it by resistance heating effects for extrusion, said apparatus also including a tubular gas seal abutting said exit tube forming a gas receiving space around the issuing rod together with a connected gas supply tube to supply a protective inert gas to said space, said tubular gas seal including a tubular extension on the exit side of said seal, said tubular gas seal having a rod entrance opening and a rod exit opening, said exit opening and said tubular extension being larger interiorly than the exterior of said rod, so that said inert gas will surround and protect the issuing rod until its temperature has been lowered to a non-oxidizing point.

3. Apparatus for forming a continuous rod or bar from particulate electrically conductive material which is subject to rapid contamination when heated in air, comprising in combination, an extrusion container lined with electrically insulating material, a discharge extrusion die for said extrusion container, a reciprocatory ram of electrically conductive material movable in said container for extruding material through said die, an electrically insulating exit tube extending from said die for a distance to protect the issuing rod, an enclosed protected supply bin for particulate material, a supply tube flexibly connected between said container and bin for bringing particulate material from said bin to the container, said supply tube including electrical insulation for material within it, and electrodes providing contact with material entering said supply tube and emerging from said exit tube for passing an electric current in series through the emerging rod, through the material in the container when present to form a continuous column and the ram when present in the column of material, and thence through the material in said supply tube, without passing current through the walls of the container and tubes, the heat supplied to the material in the supply tube and container serving to heat and soften it by resistance heating effects for extrusion, said apparatus also including a vibrator connected to said bin to vibrate the bin and said particulate material contained therein so as to pre-compact it in said supply tube at and below the adjacent entrance electrode.

4. Apparatus for forming a continuous rod or bar from particulate electrically conductive material which is subject to rapid contamination when heated in air, comprising in combination, an extrusion container lined with electrically insulating material, a discharge extrusion die for said extrusion container, a reciprocatory ram of electrically conductive material movable in said container for extruding material through said die, an electrically insulating exit tube extending from said die for a distance to protect the issuing rod, an enclosed protected supply bin for particulate material, a supply tube connected between said container and bin for bringing particulate material from said bin to the container, said supply tube including electrical insulation for material within it, and electrodes providing contact with material entering said supply tube and emerging from said exit tube for passing an electric current in series through the emerging rod, through the material in the container when present to form a continuous column and the ram when present in the column of material, and thence through the material in said supply tube, without passing current through the walls of the container and tubes, the heat supplied to the material in the supply tube and container serving to heat and soften it by resistance heating effects for extrusion, a vibrator connected to said bin to vibrate the bin and the particulate material contained therein so as to precompact it in said supply tube at and below the adjacent entrance electrode, an electrically insulating compression container forming a passage between the supply tube and the extrusion container, and an electrically conductive reciprocating compression ram operating in said compression container to compact the material in a different direction from the direction it is compacted in the extrusion container and to force it into the extrusion container while current through the material is maintained through the material alone or through the material and rams together when the rams are interposed in the line of flow of material.

5. Apparatus for extruding a continuous bar product from a supply of particulate electrically conductive metal which is subject to rapid contamination when heated in air comprising: a work material container having a vertical extrusion chamber and at least one horizontal compression chamber which latter intersects and joins said vertical extrusion chamber near the bottom thereof, each of the vertical and horizontal chambers being insulated throughout the work material-holding length thereof; a lead-off material supply tube for each said horizontal chamber, said supply tube leading into a mating upper opening along said horizontal chamber which opening is remote from said vertical chamber, said tube being completely electrically insulated from said particulate material throughout its length; a sealed bin for each said supply tube; said bin having a spout spaced from said tube, a non-conductive flexible tube connection which joins and forms an air tight seal between each said bin spout and the adjacent said tube; said bin having a first opening which may be unsealed for the admission of particulate work material, said bin having a lower second opening to the spout from which said work material may flow into said tube, and said bin having a third opening by which air may be evacuated to create a vacuum in said bin; a vibrator for each said bin to vibrate the same and facilitate the flow of work material from said bin; a first electrode connected to said bin spout to pass current to the material if present in the spout; an electrically conductive vertical extrusion ram movable, in sealed relation, in said vertical extrusion chamber; an electrically conductive horizontal compression ram for each said horizontal compression chamber and movable in sealed relation in the same; an extrusion die with a die bore including an orifice therethrough installed in the bottom of said vertical extrusion chamber; a retainer block having a bore therethrough, said block being affixed to said container and supporting said die so that the die bore orifice thereof is aligned with said block bore, said block bore being electrically insulated along the length thereof; a second electrode electrically insulated from said block but sealed thereagainst, said second electrode having a bore through which the extruded product moves in electrical contact therewith, said second electrode having an opening leading into its said bore for the admission of an inert gas which latter exits in the direction of extrusion and around said extruded bar product; a ring nozzle positioned against the exit end of said second electrode, said nozzle being for a suitable coolant which is sprayed against said extruded product by said nozzle; whereby said work material is fed from said bin through said spout, in electrical contact therewith, through said tube and into said horizontal compression chamber from whence said work material is forced into said vertical extrusion chamber to later be extruded through said die bore and orifice as said extruded bar product which latter is protected by said inert gas until cooled by said coolant; whereby electric current passes from said second electrode, through said extruded product, through said work material on the incoming side of said die and through said extrusion ram when present in the column of material, through the column of material at said compression chamber and through said horizontal compression ram when present in the column of material, through the work material at said tube, and to said first electrode thus resistance-heating said work material for the compacting and extruding thereof; and whereby pressure applied by said horizontal ram is sufficient to cause the filling of said vertical extrusion chamber and, while said horizontal ram is advanced, pressure applied by said vertical extrusion ram is sufficient to cause extrusion of material through said die.

References Cited in the file of this patent

UNITED STATES PATENTS

| | | |
|---|---|---|
| 338,561 | Shaw | Mar. 23, 1886 |
| 604,137 | Bishop | May 17, 1898 |
| 1,026,429 | Coolidge | May 14, 1912 |
| 1,664,976 | Hanff | Apr. 3, 1928 |
| 2,021,828 | Berry | Nov. 19, 1935 |
| 2,033,975 | Davis | Mar. 17, 1936 |
| 2,097,502 | Southgate | Nov. 2, 1937 |
| 2,181,987 | Beaver et al. | Dec. 5, 1939 |
| 2,241,543 | Deitz | May 13, 1941 |
| 2,320,801 | Simons | June 1, 1943 |
| 2,391,752 | Stern | Dec. 25, 1945 |
| 2,393,131 | Vang | Jan. 15, 1946 |
| 2,408,627 | Green | Oct. 1, 1946 |
| 2,620,922 | Deutsch | Dec. 9, 1952 |
| 2,639,809 | Perry et al. | May 26, 1953 |
| 2,656,743 | Leavenworth | Oct. 27, 1953 |
| 2,709,842 | Findlay | June 7, 1955 |
| 2,755,925 | Boccon-Gibod et al. | July 24, 1956 |
| 2,806,596 | Dodds et al. | Sept. 17, 1957 |
| 2,863,557 | Munker | Dec. 9, 1958 |

FOREIGN PATENTS

| | | |
|---|---|---|
| 456,383 | Canada | May 3, 1949 |
| 998,036 | France | Sept. 19, 1951 |
| 1,059,187 | France | Nov. 10, 1953 |
| 1,089,299 | France | Sept. 29, 1954 |